(12) United States Patent
Brodie et al.

(10) Patent No.: US 8,902,352 B2
(45) Date of Patent: Dec. 2, 2014

(54) LENS BARREL MECHANICAL INTERFERENCE PREVENTION MEASURES FOR CAMERA MODULE VOICE COIL MOTOR DESIGN

(71) Applicant: Apple Inc., Cupertino, CA (US)

(72) Inventors: Douglas Stuart Brodie, Los Gatos, CA (US); Steven Webster, Palo Alto, CA (US); Terence N. Tam, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 88 days.

(21) Appl. No.: 13/631,642

(22) Filed: Sep. 28, 2012

(65) Prior Publication Data

US 2013/0329126 A1   Dec. 12, 2013

Related U.S. Application Data

(60) Provisional application No. 61/657,620, filed on Jun. 8, 2012.

(51) Int. Cl.
*H04N 5/225*   (2006.01)

(52) U.S. Cl.
USPC ............ 348/360; 348/373; 348/374; 348/375

(58) Field of Classification Search
CPC ........................ H04N 5/2254; H04N 5/2257
See application file for complete search history.

(56) References Cited

U.S. PATENT DOCUMENTS

| | | | |
|---|---|---|---|
| 6,965,486 B2 | 11/2005 | Lee | |
| 7,702,233 B2* | 4/2010 | Oh et al. | 396/133 |
| 8,049,815 B2 | 11/2011 | Huang et al. | |
| 2005/0048692 A1* | 3/2005 | Hanada et al. | 438/106 |
| 2009/0302205 A9* | 12/2009 | Olsen et al. | 250/226 |
| 2010/0205793 A1* | 8/2010 | Ko et al. | 29/281.5 |
| 2011/0002056 A1* | 1/2011 | Ko | 359/823 |

(Continued)

FOREIGN PATENT DOCUMENTS

| | | |
|---|---|---|
| EP | 2096475 A1 | 2/2009 |
| JP | 2008-216707 A | 9/2008 |
| JP | 2011-180513 A | 9/2011 |

OTHER PUBLICATIONS

PCT International Search Report and Written Opinion, for corresponding International Application No. PCT/US2013/042530, mailing date of Jul. 23, 2013, 8 pages.

*Primary Examiner* — Lin Ye
*Assistant Examiner* — John H Morehead, III
(74) *Attorney, Agent, or Firm* — Blakely, Sokoloff, Taylor & Zafman LLP (57) ABSTRACT

A camera module has an image sensor and a lens assembly that includes a lens barrel having a first cylindrical portion that includes an externally threaded portion and a second cylindrical portion that has a larger diameter than the externally threaded portion. A lens moving mechanism includes a movable sleeve having internal threads that receive the externally threaded portion of the lens assembly. The lens moving mechanism is coupled to the image sensor such that the second cylindrical portion of the lens assembly is closest to the image sensor. The camera module is assembled by inserting the lens assembly into the lens moving mechanism from the side closest to the image sensor. An installation tool may engage the second cylindrical portion to rotate the lens assembly and engage the threaded portions. Features may be provided to retain the lens assembly in the lens moving mechanism before joining the threaded portions.

30 Claims, 7 Drawing Sheets

(56) References Cited

U.S. PATENT DOCUMENTS

| | | |
|---|---|---|
| 2011/0008034 A1 | 1/2011 | Kamatani et al. |
| 2011/0075277 A1* | 3/2011 | Lee et al. ............... 359/819 |
| 2011/0228154 A1* | 9/2011 | Westerweck et al. ....... 348/311 |
| 2012/0025398 A1 | 2/2012 | Jang et al. |
| 2012/0049338 A1 | 3/2012 | Chen et al. |
| 2012/0068319 A1 | 3/2012 | Choi et al. |
| 2012/0086003 A1* | 4/2012 | Park ............... 257/48 |
| 2012/0307140 A1* | 12/2012 | Wang et al. ............. 348/374 |

\* cited by examiner

LENS BARREL MECHANICAL INTERFERENCE PREVENTION MEASURES FOR CAMERA MODULE VOICE COIL MOTOR DESIGN

CROSS REFERENCE TO RELATED APPLICATIONS

This application claims the benefit pursuant to 35 U.S.C. 119(e) of U.S. Provisional Application No. 61/657,620, filed Jun. 8, 2012, which application is specifically incorporated herein, in its entirety, by reference.

BACKGROUND

1. Field

Embodiments of the invention relate to the field of camera lens modules; and more specifically, to a camera module for use in portable digital devices.

2. Background

Many portable electronic devices, such as mobile cellular telephones, include a digital camera. The lenses for such cameras must be compact to fit within the case of the portable electronic device. At the same time there is a desire to provide an increasingly high quality camera function in these devices. To provide a higher quality image, some cameras found in portable electronic devices provide an autofocus feature.

The lens may be mounted in a mechanism that moves the lens along its optical axis to change the distance between the lens and the image sensor. This changes the focal distance of the camera and allows a sharper image to be obtained for subjects over a greater range of distances from the camera. One such lens moving mechanism for moving a lens is a voice coil motor (VCM).

Typically a lens is inserted into a lens moving mechanism, such as a VCM, and an image sensor is then assembled to the lens moving mechanism to provide a camera lens module. The module is assembled in clean room conditions so that dust is not trapped between the lens and the image sensor. The assembled camera lens module provides all the optical components in a single package that can be assembled into the portable electronic device.

Typically the lens will be joined to the lens moving mechanism by screw threads. The assembly is difficult because the lens and the lens moving mechanism are fairly delicate and the assembly must be done without exerting excessive forces on the lens or the mechanism, either axially or rotationally. The small size of the parts further complicates the assembly. A typical lens used in a portable electronic device may have a diameter of about 0.25 inches (6.5 millimeters).

A VCM for a camera module applications is a highly space constrained device. The demand for improved optics in camera module applications requires larger, heavier, lens components to be integrated within a VCM. A lens barrel is integrated within the VCM containing optical components of a lens system. Typically a cylindrical lens barrel is threaded in place within the carrier or holder of a VCM from the top opening furthest from the imaging plane. Typically the largest lens element within an optical system is the last element closest to the imaging plane.

It would be desirable to provide lens insertion methods and structures that allow the camera lens module to be reduced in size.

SUMMARY

A camera module has an image sensor and a lens assembly that includes a lens barrel having a first cylindrical portion that includes an externally threaded portion and a second cylindrical portion that has a larger diameter than the externally threaded portion. A lens moving mechanism includes a movable sleeve having internal threads that receive the externally threaded portion of the lens assembly. The lens moving mechanism is coupled to the image sensor such that the second cylindrical portion of the lens assembly is closest to the image sensor. The camera module is assembled by inserting the lens assembly into the lens moving mechanism from the side closest to the image sensor. An installation tool may engage the second cylindrical portion to rotate the lens assembly and engage the threaded portions. Features may be provided to retain the lens assembly in the lens moving mechanism before joining the threaded portions.

Other features and advantages of the present invention will be apparent from the accompanying drawings and from the detailed description that follows below.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements.

DETAILED DESCRIPTION

This disclosure describes methods for constraining a bottom side assembly lens barrel from mechanical interference with underlying structures within a camera module system.

In the following description, numerous specific details are set forth. However, it is understood that embodiments of the invention may be practiced without these specific details. In other instances, well-known circuits, structures and techniques have not been shown in detail in order not to obscure the understanding of this description.

Figures 1, 2, 3:
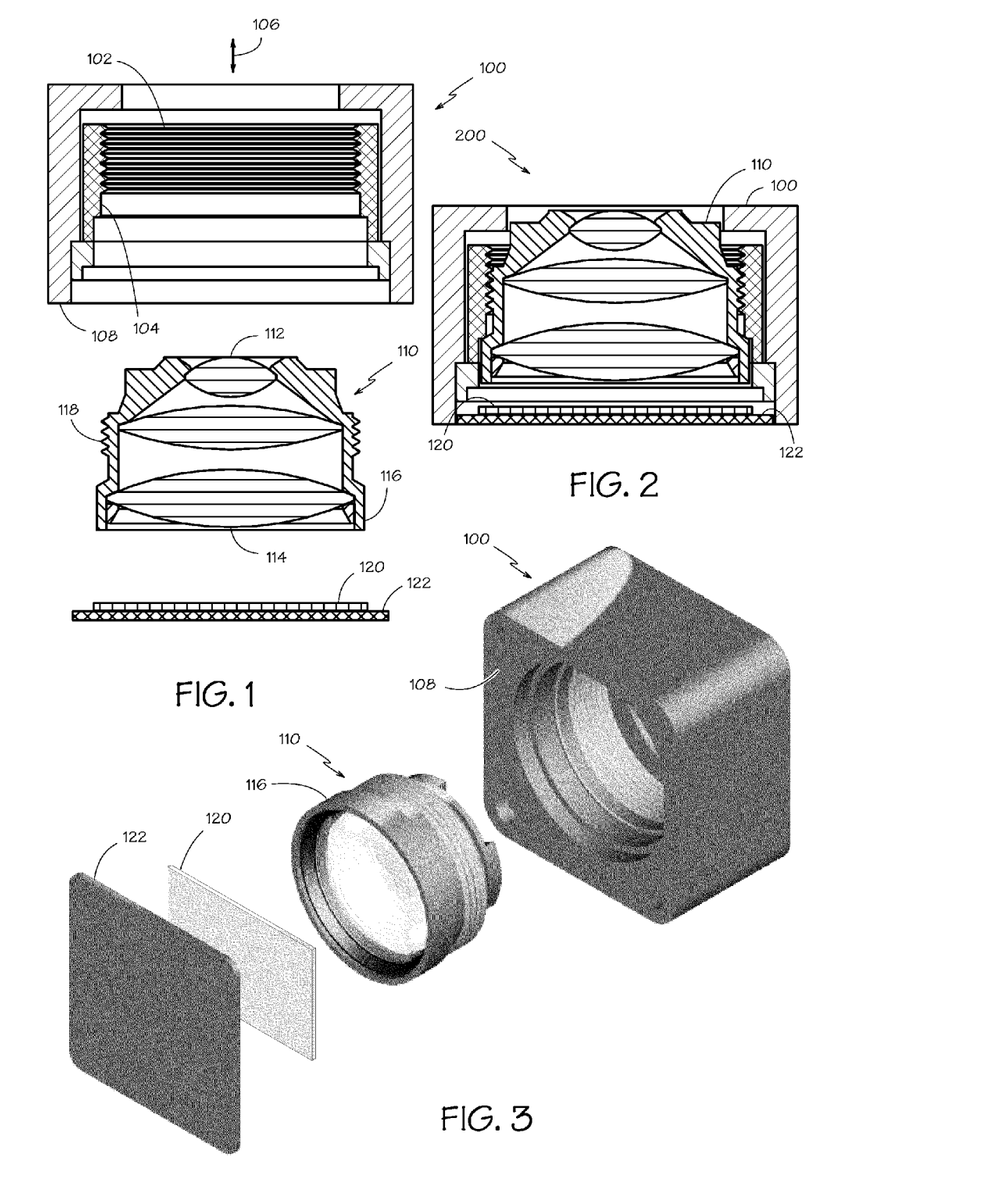
FIG. 1 is a cross-sectional view of the components of a camera module in an unassembled configuration.
FIG. 2 is a cross-sectional view of the camera module of FIG. 1 in an assembled configuration.
FIG. 3 is a pictorial view of the camera module of FIG. 1 in an unassembled configuration.

FIG. 1 is a cross-sectional view of the components of a camera module in an unassembled configuration. FIG. 2 is a cross-sectional view of the camera module 200 of FIG. 1 in an assembled configuration. FIG. 3 is a pictorial view of the camera module of FIG. 1 in an unassembled configuration.

The camera module shown in FIGS. 1-3 includes a lens moving mechanism 100, which may be a voice coil motor (VCM). The lens moving mechanism 100 includes a movable sleeve 104 having internal threads 102. The lens moving mechanism 100 provides means for moving the movable sleeve 104 axially in the direction shown by the two-headed arrow 106. A particular means for moving the movable sleeve 104 is not shown and any such means may be used.

The camera module further includes a lens assembly that includes two or more lenses 112, 114 mounted in a lens barrel 110. The lens barrel designs achieve space efficiency within the lens moving mechanism by adopting a non-cylindrical shape. The lens barrels is designed with a chamfer towards the bottom of the barrel, the larger flared bottom diameter of the lens barrel contains the larger lens element(s), whilst the smaller diameter lens elements are housed in the threaded upper portion of the lens barrel. This type of lens barrel design requires assembly by threading into the lens moving mechanism from the bottom side, rather than the conventional top side approach. When molding the carrier for a bottom assembly VCM, the inner threaded insert mold is designed to thread outwards from the bottom side of the carrier during tool release. The lens barrel is then assembled from this same end.

The lens barrel has a first cylindrical portion that includes an externally threaded portion 118 and a second cylindrical portion 116 that has a larger diameter than the externally threaded portion. This lens assembly differs from conventional lens assemblies in which the externally threaded portion has the largest diameter of any portion of the lens barrel.

The diameter of the second cylindrical portion 116 is selected to be just slightly larger than the largest diameter lens 114 in the lens assembly. This lens 114 will be the lens closest to an image sensor 120. Providing a second cylindrical portion 116 that has a larger diameter than the externally threaded portion 118 allows the lens moving mechanism 100 to be more compact because the internal threads 102 of the movable sleeve 104 do not have to have a diameter that can accommodate the second cylindrical portion 116. However this creates a difficulty in assembling the camera module 200.

Typically a lens assembly is assembled to a lens moving mechanism by inserting the lens assembly into the lens moving mechanism from the side furthest from the image sensor. This requires that the entire portion of lens barrel below the externally threaded portion, including the portion supporting the largest diameter lens, pass through the internally threaded portion of a movable sleeve in the lens moving mechanism toward the image sensor. This allows the lens barrel to be held at the end furthest from the image sensor, the end which supports the smallest lens and which may be referred to as the front end of the lens assembly.

It will be appreciated that while a lens assembly may be described a moving in relation to an image sensor during assembly, such description is merely to establish the direction within the components of the camera module and the image sensor will likely not be present in the camera module when the lens assembly is assembled to the lens moving mechanism. Thus a description of a lens assembly advancing toward an image sensor during assembly should be understood to include advancing toward the place where an image sensor would be positioned in a fully assembled camera module.

The smallest lens at the front end of the lens assembly is much smaller in diameter than the outer diameter of the lens barrel. This allows engagement features to be provided in the front end of the lens barrel. An assembly tool can easily engage the engagement features and assemble the lens assembly to the internally threaded portion of the movable sleeve with the lens assembly advancing toward the image sensor as it is threaded into the movable sleeve.

In embodiments of the invention, the second cylindrical portion 116 has a larger diameter than the externally threaded portion 118 of the lens barrel, and the corresponding internally threaded portion 102 of the movable sleeve 104. Therefore, a lens assembly 200 that embodies the invention cannot be assembled to the internally threaded portion 102 of the movable sleeve 104 with the lens assembly advancing toward the image sensor 120 as it is threaded into the movable sleeve. It is required that a lens assembly 200 that embodies the invention be assembled to the internally threaded portion 102 of the movable sleeve 104 with the lens assembly advancing away from the image sensor 120 as it is threaded into the movable sleeve. The lens assembly 200 must be assembled from the back side 108 of the lens moving mechanism 100, which is the side that will be closest to the image sensor 120. The image sensor 120 may be supported by a substrate 122 that is assembled to the lens moving mechanism 100 to complete the camera module 100.

Assembling the lens assembly 200 from the back side 108 of the lens moving mechanism 100 requires the lens barrel 110 to be held at the end 116 closest to the image sensor, the end which supports the largest lens 114 and which may be referred to as the back end of the lens assembly. At the back end 116 of the lens assembly 200, it is desirable to make the lens barrel 110 as small as possible to keep the camera module 100 compact. The back end 116 of the lens assembly 200 may have a diameter that is only 0.2 to 0.4 millimeters larger than the large lens 114 supported by the back end of the lens barrel. Thus the walls of the lens barrel 110 at the back end 116 may be only 0.1 to 0.2 millimeters. Further, the large lens 114 may need to approach to within 30 microns of an infrared cut filter (not shown) that is between the lens assembly 200 and the image sensor 120. Therefore thickest portion of the rear surface of the large lens 114 must be approximately flush with the back end of the lens assembly 200. This configuration makes it difficult to hold the lens assembly 200 for assembly to the lens moving mechanism 100 from the back side 108.

A camera module that embodies the present invention may be assembled by inserting the lens assembly 110 into the lens moving mechanism 100 from the back side. The lens assembly 110 includes a lens barrel 110 having a first cylindrical portion that includes an externally threaded portion 118 and a second cylindrical portion 116 that has a larger diameter than the externally threaded portion. An installation tool is engaged with the second cylindrical portion 116 of the lens assembly 110. A portion of the installation tool that engages the lens assembly has a diameter no greater than the diameter of the second cylindrical portion 116 of the lens assembly 110. This permits the installation tool to pass through the back side of the lens moving mechanism 100 as necessary during the assembly process. The installation tool rotates the lens assembly 110 to engage the externally threaded portion 118 of the lens assembly 110 with the internally threaded portion 102 of the movable sleeve 104 of the lens moving mechanism 100. The lens assembly 110 advances away from the image sensor 120 as it is threaded into the movable sleeve 104. The image sensor 120 is coupled to the lens moving mechanism 100 such that the second cylindrical portion 116 of the lens assembly 110 is closest to the image sensor.

Figure 4A:
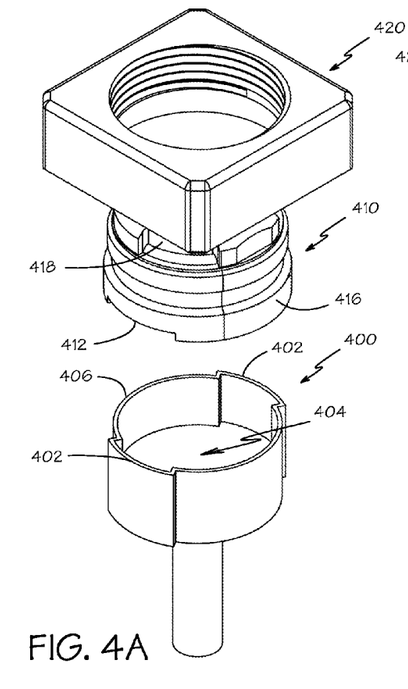
FIGS. 4A and 4B are pictorial views of another camera module in an unassembled configuration with a tool for assembling the lens assembly to the lens moving mechanism.
Figure 4B:
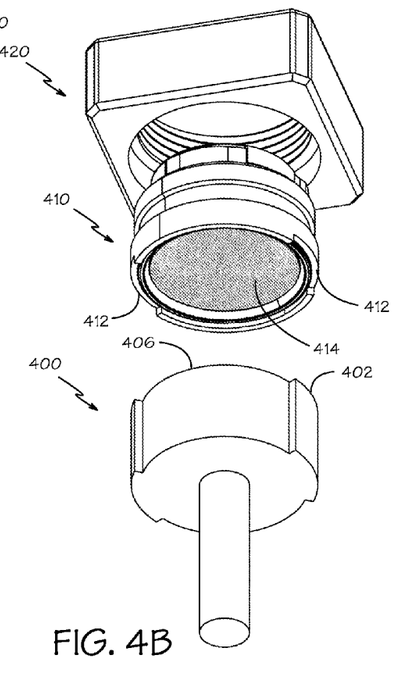
Figure 5:
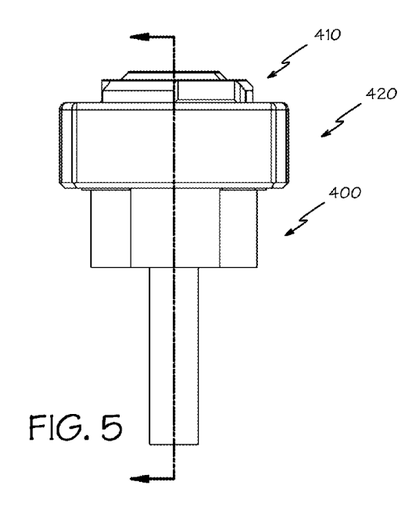
FIG. 5 is a side view of the camera module of FIGS. 4A and 4B in an assembled configuration with the tool for assembling the lens assembly to the lens moving mechanism.
Figure 6:
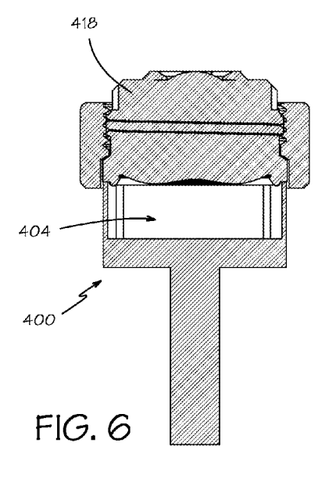
FIG. 6 is a cross-sectional view of the camera module taken along section line 6-6 in FIG. 5.

FIGS. 4A and 4B are pictorial views of another camera module in an unassembled configuration with a tool 400 for assembling the lens assembly 410 to the lens moving mechanism 420. FIG. 5 is a side view of the camera module of FIGS. 4A and 4B in an assembled configuration with the tool 400 for assembling the lens assembly 410 to the lens moving mechanism 420. FIG. 6 is a cross-sectional view of the camera module taken along section line 6-6 in FIG. 5.

In this embodiment the tool 400 includes protrusions 402 that mechanically engage notches 412 provided in the second cylindrical portion 416 of the lens assembly 410 that is closest to the image sensor. A wall 406 of the tool 400 may fit the inside cylindrical surface to the lens assembly 410 adjacent the large lens 414 to provide support for the lens assembly 410 during the assembly process. The center portion 404 of the tool 400 is recessed to provide clearance that prevents the tool from touching the surface of the large lens 414.

A vacuum may be used to hold the lens assembly 410 with the installation tool 400. For example, a vacuum may be applied in the center portion 404 of the tool 400.

The lens assembly 410 may include engagement features 418 at the front of the lens assembly. The engagement features 418 may be used to rotate the lens assembly 410 from the front side after the lens assembly 410 is initially engaged with the lens moving mechanism 420 from the back side.

Figures 7, 8:
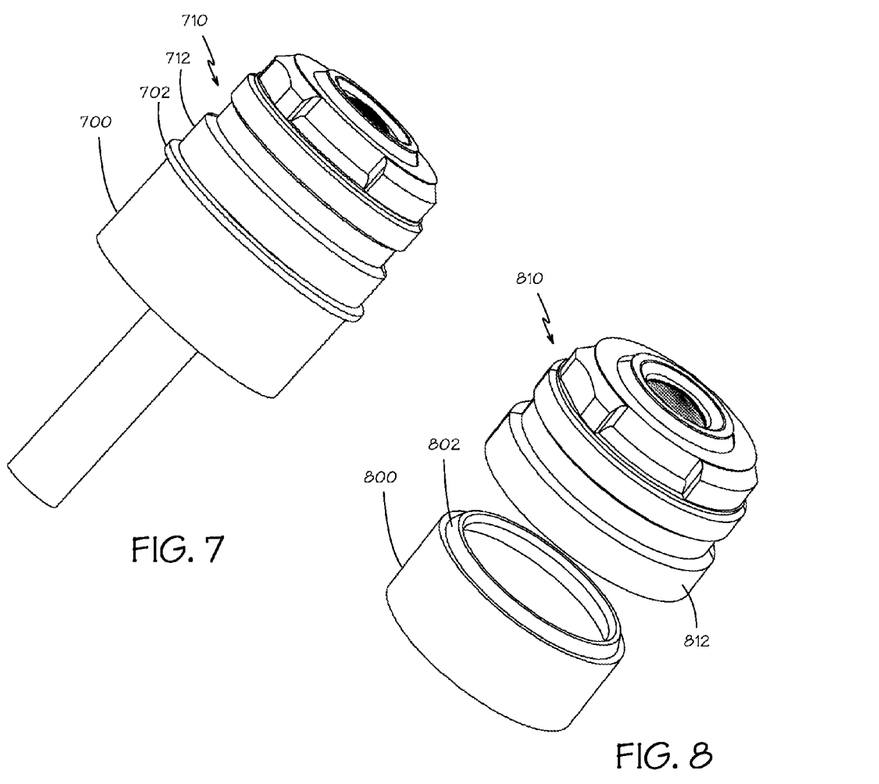
FIG. 7 is a pictorial view of another lens assembly with another tool for assembling the lens assembly to the lens moving mechanism.
FIG. 8 is a pictorial view of another lens assembly with another tool for assembling the lens assembly to the lens moving mechanism.

FIG. 7 is a pictorial view of another lens assembly 710 with another tool 700 for assembling the lens assembly to a lens moving mechanism. In this embodiment, the tool has a flat surface 702 to engage the flat surface at the back of the second cylindrical portion 712 of the lens assembly 710.

In some embodiments, the surface of the installation tool that engages the second cylindrical portion 712 of the lens assembly 710 may be a material having a high coefficient of static friction with the lens barrel material. For example, the coefficient of static friction may be greater than 0.6.

In some embodiments, a temporary adhesive may join the second cylindrical portion 712 of the lens barrel to the installation tool 700. The lens barrel is separated from the installation tool 700 at the adhesive joint once the lens assembly 710 has been assembled.

Figure 9:
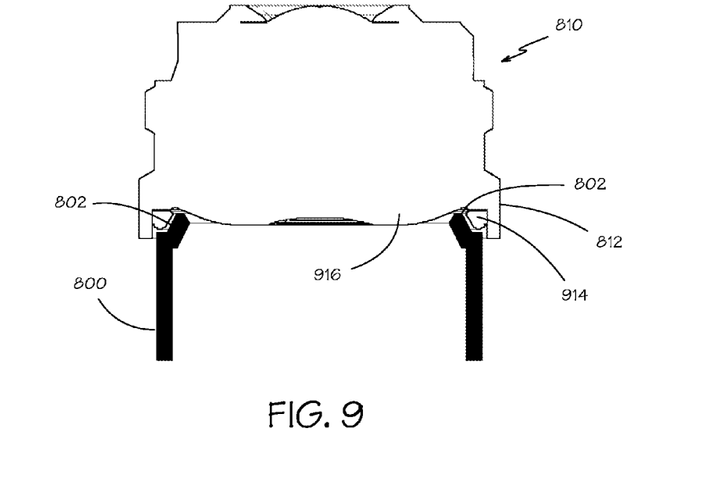
FIG. 9 is a cross-sectional view of the tool of FIG. 8 engaging the lens assembly.

FIG. 8 is a pictorial view of another lens assembly 810 with another tool 800 for assembling the lens assembly to the lens moving mechanism. This tool 800 includes a conical surface 802 that engages an inside surface of the second cylindrical portion 812 of the lens assembly 810. FIG. 9 is a cross-sectional view of the tool of FIG. 8 engaging the inside surface of the second cylindrical portion 812 of the lens assembly 810. The lens assembly 810 may provide a conical recess that the conical surface 802 of the installation tool presses against. A retaining ring 914 for the large lens 916 may provide the conical surface in the second cylindrical portion 812 of the lens assembly 810. The conical surface may be advantages in that a greater pressure can be applied normal to the gripping surfaces without exceeding the allowable axial force applied to the lens moving mechanism.

The conical surface 802 of the installation tool 800 may be a resilient material. The conical surface 802 of the installation tool 800 may be a material having a high coefficient of static friction with the lens barrel material. For example, the coefficient of static friction may be greater than 0.6

Figure 10:
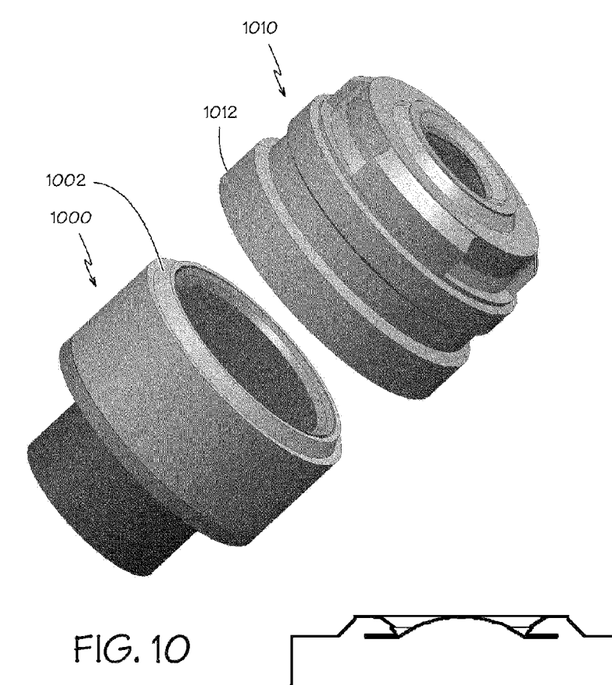
FIG. 10 is a pictorial view of another lens assembly with another tool for assembling the lens assembly to the lens moving mechanism.
Figure 11:
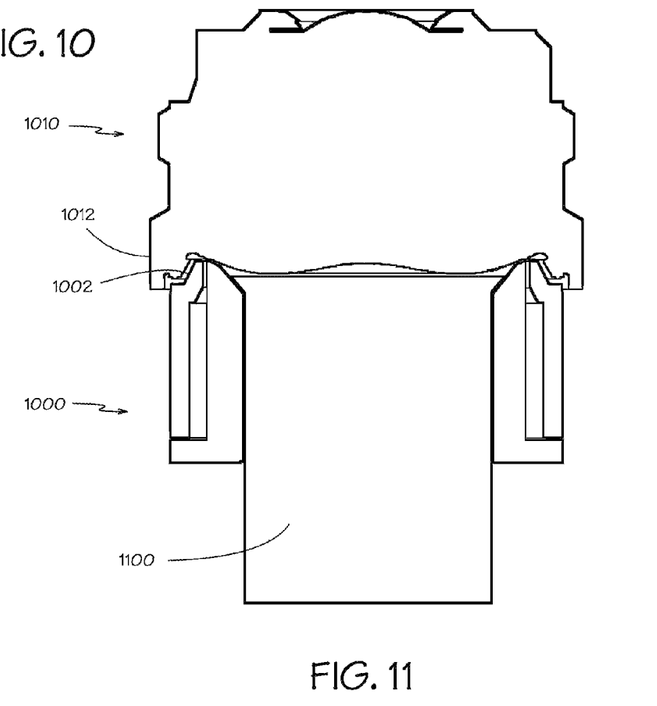
FIG. 11 is a cross-sectional view of the tool of FIG. 10 engaging the lens assembly.

FIG. 10 is a pictorial view of another lens assembly 1010 with another tool 1000 for assembling the lens assembly to the lens moving mechanism. FIG. 11 is a cross-sectional view of the tool 1000 of FIG. 10 engaging the lens assembly 1010. In this embodiment, the inside surface of the second cylindrical portion 1012 of the lens assembly 1010 provides a recess and the installation tool 1000 provides a gripping section 1002 that expands to press against the recess. As illustrated the gripping section 1002 may be conical to engage a corresponding conical recess. In other embodiments not illustrated, the recess may be cylindrical with a surface parallel to an optical axis of the lens assembly and the tool may provide a cylindrical gripping section.

As may be seen in FIG. 11, the gripping section 1002 of the installation tool 1000 may be mechanically expanded to press against the recess in the second cylindrical portion 1012 of the lens assembly 1010. For example, a plunger 1100 may be moved in an axial direction to expand the gripping section 1002 of the installation tool 1000.

In other embodiments, the gripping section of the installation tool may be pneumatically expanded to press against the recess in the second cylindrical portion 1012 of the lens assembly 1010.

In other embodiments, the gripping section of the installation tool may be hydraulically expanded to press against the recess in the second cylindrical portion 1012 of the lens assembly 1010.

The gripping section 1002 of the installation tool 1000 may be a resilient material. The gripping section 1002 of the installation tool 1000 may be a material having a high coefficient of static friction with the lens barrel material. For example, the coefficient of static friction may be greater than 0.6.

In other embodiments, a vacuum may be applied to hold the lens assembly 1010 with the installation tool 1000. The vacuum may cause the lens assembly 1010 to press against the gripping section 1002 of the installation tool 1000 and cause the gripping section to expand and press against the recess in the second cylindrical portion 1012 of the lens assembly.

Figure 12:
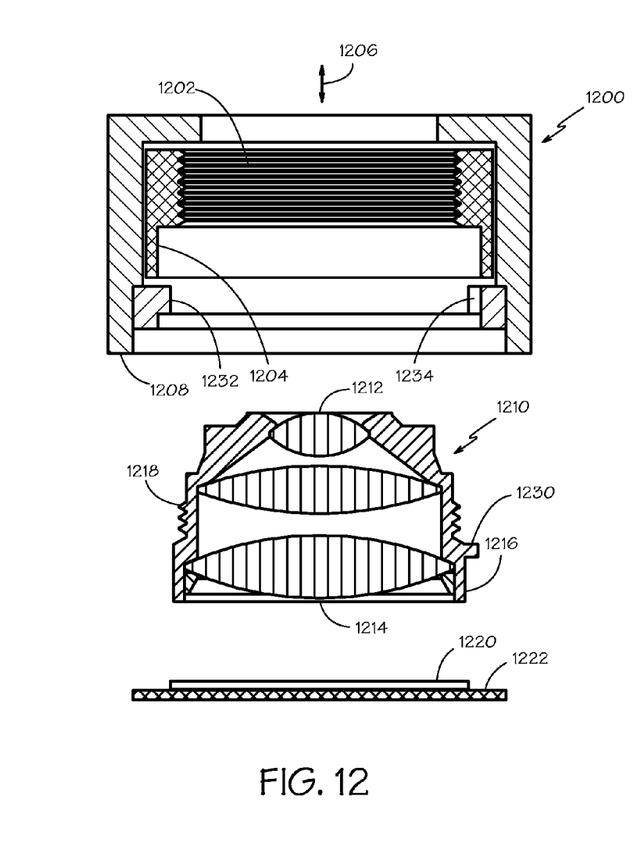
FIG. 12 is a cross-sectional view of the components of a camera module in an unassembled configuration.
Figures 13, 14:
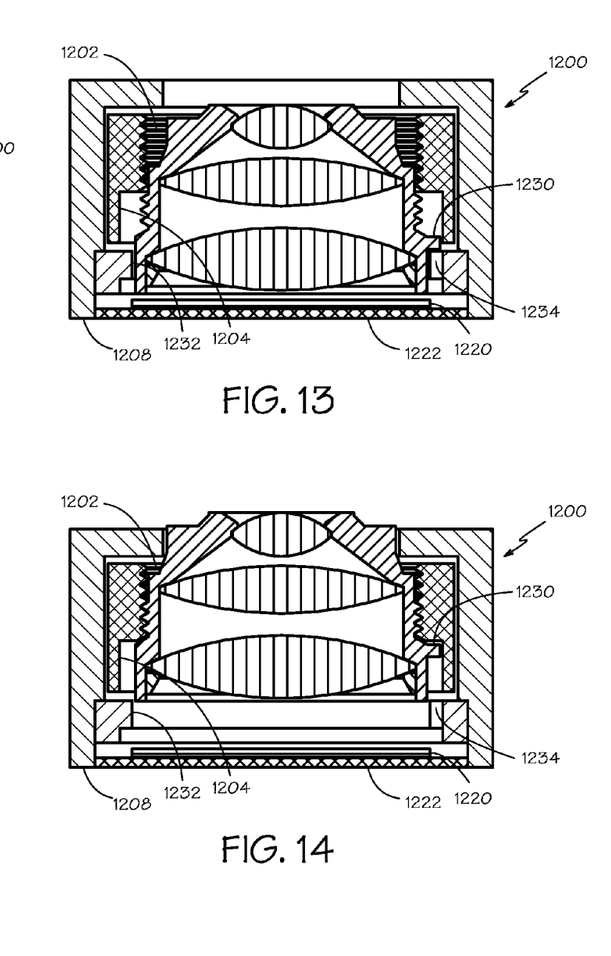
FIG. 13 is a cross-sectional view of the camera module of FIG. 12 in a partially assembled configuration.
FIG. 14 is a cross-sectional view of the camera module of FIG. 12 in a fully assembled configuration.

FIG. 12 is a cross-sectional view of the components of another camera module in an unassembled configuration. FIG. 13 is a cross-sectional view of the camera module of FIG. 12 in a partially assembled configuration. FIG. 14 is a cross-sectional view of the camera module of FIG. 12 in a fully assembled configuration.

The camera module shown in FIGS. 12-14 includes a lens moving mechanism 1200, which may be a voice coil motor. The lens moving mechanism 1200 includes a movable sleeve 1204 having internal threads 1202. The lens moving mechanism 1200 provides means for moving the movable sleeve 1204 axially in the direction shown by the two-headed arrow 1206. A particular means for moving the movable sleeve 1204 is not shown and any such means may be used.

The camera module further includes a lens assembly that includes two or more lenses 1212, 1214 mounted in a lens barrel 1210. The lens barrel has a first cylindrical portion that includes an externally threaded portion 1218 and a second cylindrical portion 1216 that has a larger diameter than the externally threaded portion. This lens assembly differs from conventional lens assemblies in which the externally threaded portion has the largest diameter of any portion of the lens barrel.

The diameter of the second cylindrical portion 1216 is selected to be just slightly larger than the largest diameter lens 1214 in the lens assembly. This lens 1214 will be the lens closest to an image sensor 1220. Providing a second cylindrical portion 1216 that has a larger diameter than the externally threaded portion 1218 allows the lens moving mechanism 1200 to be more compact because the internal threads 1202 of the movable sleeve 1204 do not have to have a diameter that can accommodate the second cylindrical portion 1216. However this creates a difficulty in assembling the camera module as previously described.

In the previously described bottom side assembly approach that assembles the lens barrel into the lens moving mechanism from end adjacent to the image sensor, there is a risk that the lens barrel will not be fully constrained in the vertical direction. Interference of the lens barrel with underlying components within the module or disengagement of the barrel threads could result. This could result in damage to camera module components, such as the image sensor, filters in the optical path, or the rearmost lens, during the assembly process or if the camera module is dropped after assembly.

In the embodiment shown in FIGS. 12-14, at least one protruding tab 1230 is included on an external cylindrical surface of the second cylindrical portion 1216 of the lens barrel 1210. The lens moving mechanism 1200 has an opening 1232 to receive the lens assembly from the bottom side. The opening 1232 includes a recess 1234 to allow the protruding tab 1230 to pass through the opening. This requires alignment of the protruding tab 1230 to the corresponding recess 1234 in the opening 1232 of the lens moving mechanism 1200.

FIG. 13 shows the camera module of FIG. 12 in a partially assembled configuration. At this stage of the assembly process the protruding tab 1230 has pass through the corresponding recess 1234 in the opening 1232 of the lens moving mechanism 1200. The movable sleeve 1204 provides sufficient clearance for the protruding tab 1230 to permit the lens barrel 1210 to be rotated freely. The protruding tab 1230 retains the lens barrel 1210 within the lens moving mechanism 1200 except for the angular position where the protruding tab 1230 is aligned to the corresponding recess 1234 in the opening 1232 of the lens moving mechanism 1200.

FIG. 14 shows the camera module of FIG. 12 in a fully assembled configuration. The movable sleeve 1204 provides sufficient clearance for the protruding tab 1230 to permit the lens barrel 1210 to be fully threaded into the movable sleeve 1204. With the lens barrel 1210 retained in the lens moving mechanism 1200 by the protruding tab 1230, it may be possible to assemble the substrate 1222, which carries the image sensor 1220 and related components, to the back side 1208 of the lens moving mechanism 1200 and then rotating the lens barrel 1210 from the front side to thread the lens barrel into the movable sleeve 1204.

Figure 15:
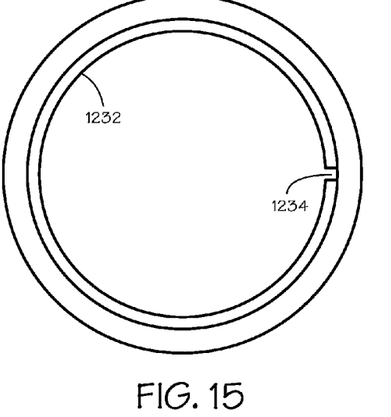
FIG. 15 is an end view of the opening of the lens moving mechanism from the camera module of FIG. 12.

FIG. 15 shows the opening 1232 of the lens moving mechanism of FIG. 12 from the bottom end. In this embodiment there is a single recess 1234 in the opening 1232 to receive the protrusion on the lens barrel.

Figure 16:
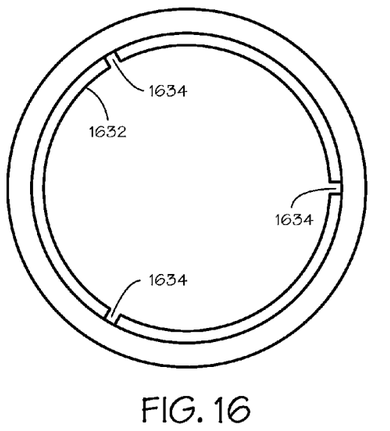
FIG. 16 is an end view of the opening of the lens moving mechanism from another camera module.

FIG. 16 shows the opening 1632 of the lens moving mechanism from the bottom end of another embodiment. In this embodiment there are three recesses 1634 in the opening 1632 to receive three corresponding protrusions on the lens barrel. The use of more than one protrusion may hold the lens in better alignment with the threaded portion of the movable sleeve.

Figure 17:
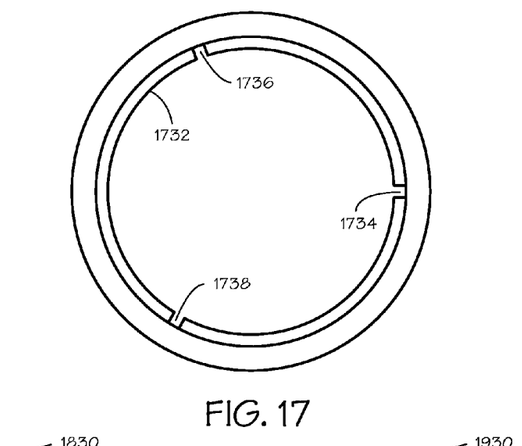
FIG. 17 is an end view of the opening of the lens moving mechanism from yet another camera module.

FIG. 17 shows the opening 1732 of the lens moving mechanism from the bottom end of yet another embodiment. In this embodiment there are three recesses 1734, 1736, 1738 in the opening 1732 to receive three corresponding protrusions on the lens barrel. Unlike the embodiment shown in FIG. 16 the recesses are arranged asymmetrically. For example, the angles between the recesses, and the corresponding protruding tabs on the lens assembly might be 110°, 120°, and 130°. It will be appreciated that the use of more than one protrusion and recess arranged symmetrically around the lens barrel increases the number of angular positions at which the lens barrel can pass through the opening thus making the lens barrel less secure in the lens moving mechanism. An asymmetric arrangement of protruding tabs and corresponding recesses allows the lens barrel to pass through the opening in only a single angular position thus increasing the security of the lens barrel in the lens moving mechanism.

Figure 18:
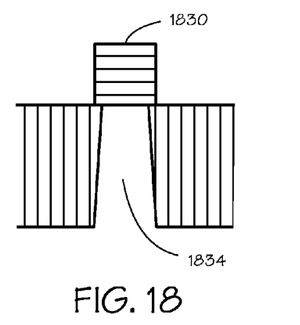
FIG. 18 is a cross-sectional view of another embodiment of a tab and a corresponding recess.

FIG. 18 shows another embodiment of a tab and a corresponding recess. In this embodiment the corresponding recess 1834 in the opening of the lens moving mechanism is chamfered wherein the width of the top opening is narrower than the width of bottom opening such that force is required to insert the protruding tab 1830 past the corresponding recess 1834 in the opening of the lens moving mechanism. It will be appreciated that the protruding tab and/or the corresponding recess may contain additional features not shown to increase their resilience and permit the necessary deformation when the lens barrel is inserted into the lens moving mechanism. This structure effectively makes the insertion of the lens barrel into the lens moving mechanism a one-way operation. The lens barrel is thereafter prevented from dropping out of the lens moving mechanism even if the protruding tab 1830 and the corresponding recess 1834 are subsequently aligned.

Figure 19:
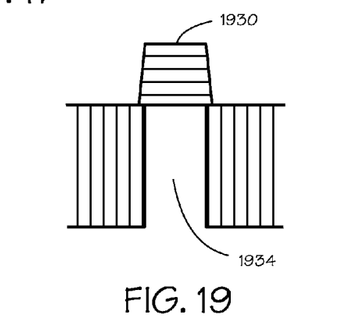
FIG. 19 is a cross-sectional view of yet another embodiment of a tab and a corresponding recess.

FIG. 19 shows another embodiment of a tab and a corresponding recess. In this embodiment the protruding tab 1930 is chamfered wherein a width of a top surface of the protruding tab is narrower than a bottom surface of the protruding tab such that force is required to insert the protruding tab past the corresponding recess 1934 in the opening of the lens moving mechanism. This embodiment is otherwise like the preceding embodiment. It will be appreciated that both the protruding tab and the corresponding recess may be chamfered and be otherwise like the preceding embodiments.

Figures 20, 21, 22, 23:
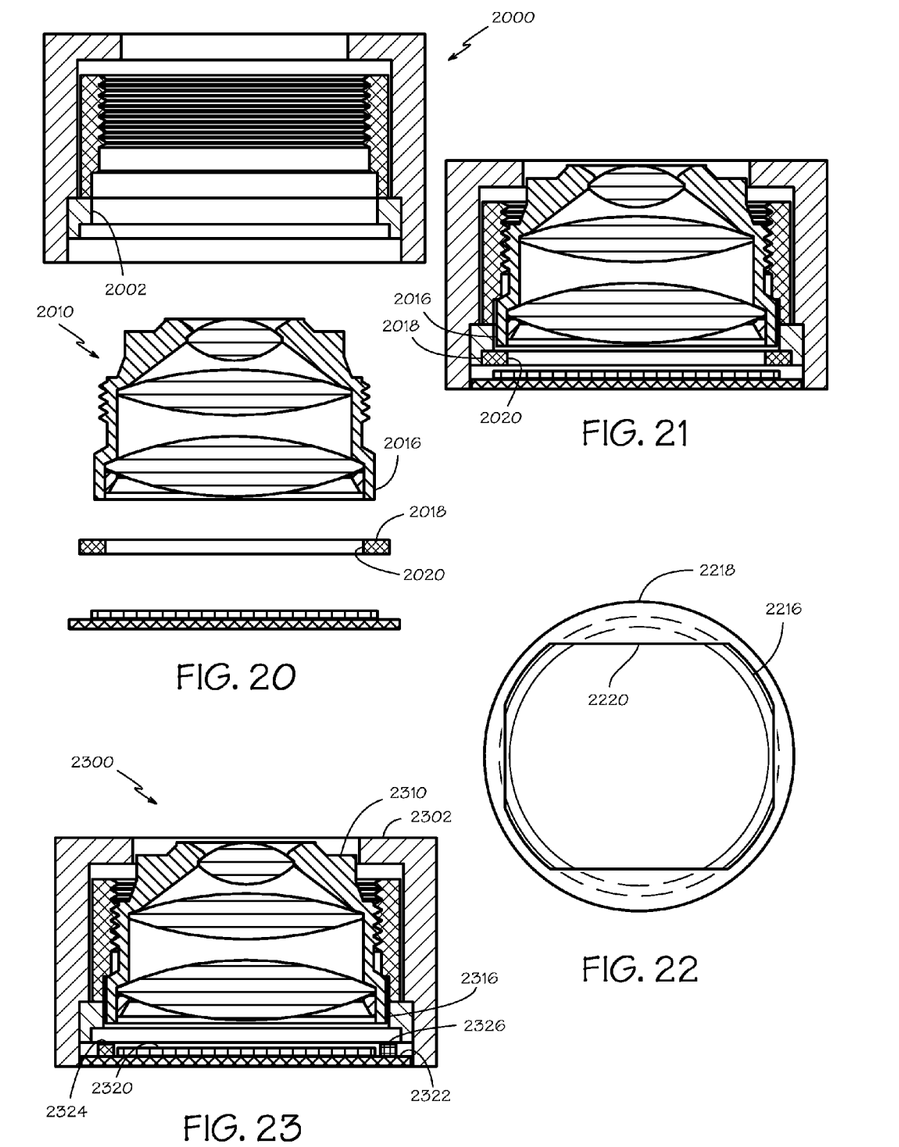
FIG. 20 is a cross-sectional view of the components of another camera module in an unassembled configuration.
FIG. 21 is a cross-sectional view of the camera module of FIG. 20 in an assembled configuration.
FIG. 22 is a plan view of a retaining structure with a bottom end of a lens assembly.
FIG. 23 is a cross-sectional view of yet another camera module in an assembled configuration.

FIG. 20 is a cross-sectional view of the components of another embodiment of a camera module in an unassembled configuration. FIG. 21 is a cross-sectional view of the camera module of FIG. 20 in an assembled configuration. In this embodiment a retaining structure 2018 is attached to the lens moving mechanism 2000 after the lens assembly 2010 is received in the lens moving mechanism to reduce a diameter of the opening 2002 on the backside of the lens moving mechanism that receives the lens assembly to be less than a diameter of the second cylindrical portion 2016 of the lens assembly 2010 adjacent the opening. The retaining structure 2018 may be a ring with a circular opening having a smaller diameter than the second cylindrical portion 2016 of the lens assembly 2010 adjacent the opening 2002.

FIG. 22 shows a plan view of a retaining structure 2218 that provides an opening with a non-circular shape, e.g. a rectangular shape, in which some, but not all, diameters of the retaining opening 2220 in the retaining structure are smaller than the diameter of the second cylindrical portion 2216 of the lens assembly adjacent the opening on the backside of the lens moving mechanism that receives the lens assembly. In the figure, the diameters of the retaining opening 2220 that occlude portions of the second cylindrical portion 2216 of the lens assembly as shown by the dashed lines are less than the diameter of the lens assembly and therefore restrain the lens assembly against contact with the image sensor.

FIG. 23 is a cross-sectional view of the components of another embodiment of a camera module 2300 in an assembled configuration. In this embodiment a protective structure 2324, 2326 is attached to the substrate 2322 at a location where the protective structure prevents the lens assembly 2310 from contacting the image sensor 2320 when not engaged with the lens moving mechanism 2302. The protective structure 2324, 2326 is aligned vertically below the lens barrel wall 2316 and has an upper surface adjacent the backside of the lens moving mechanism 2302 that is higher than the components on the underlying substrate 2322 being protected. Such protective structures could serve either a purely mechanical purpose, or additionally a functional purpose. An example of a functional protective structure would be positioning of one or more capacitors that are mechanically and electrically coupled to the underlying substrate 2322. A purely mechanical protective structure could consist of a molded or machined structure that is mechanically fastened to the substrate 2322, such as being glued, or soldered in place. A purely mechanical protective structure could consist of the same bulk material as the substrate.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:

1. A camera module comprising:
   a lens assembly that includes a lens barrel having a first cylindrical portion that includes an externally threaded portion and a second cylindrical portion that has a larger diameter than the externally threaded portion;
   an external cylindrical surface on the second cylindrical portion of the lens assembly;
   at least one protruding tab included on the external cylindrical surface;
   an image sensor;
   a lens moving mechanism that includes a movable sleeve having internal threads that receive the externally threaded portion of the lens assembly, the lens moving mechanism being coupled to the image sensor such that the second cylindrical portion of the lens assembly is closest to the image sensor, the lens moving mechanism having an opening to receive the lens assembly that requires alignment of the at least one protruding tab to a corresponding recess in the opening of the lens moving mechanism.

2. The camera module of claim 1 wherein the lens assembly includes at least two lenses, one lens being mounted in the second cylindrical portion of the lens assembly.

3. The camera module of claim 1 wherein the lens moving mechanism is a voice coil motor.

4. The camera module of claim 1 wherein the protruding tab is chamfered to have a width of a top surface of the protruding tab that is narrower than a width of a bottom surface of the protruding tab such that force is required to insert the protruding tab past the corresponding recess in the opening of the lens moving mechanism.

5. The camera module of claim 1 wherein the corresponding recess in the opening of the lens moving mechanism is chamfered to have a width of a top opening that is narrower than a width of a bottom opening such that force is required to insert the protruding tab past the corresponding recess in the opening of the lens moving mechanism.

6. The camera module of claim 1 further comprising a retaining structure that is attached to the lens moving mechanism after the lens assembly is received in the lens moving mechanism to reduce a diameter of the opening to be less than a diameter of the lens assembly.

7. The camera module of claim 1 further comprising a substrate to which the image sensor is attached and a protective structure attached to the substrate at a location where the protective structure prevents the lens assembly from contacting the image sensor when not engaged with the lens moving mechanism.

8. A camera module comprising:
   a lens assembly that includes a lens barrel having a first cylindrical portion that includes an externally threaded portion and a second cylindrical portion that has a larger diameter than the externally threaded portion;
   an external cylindrical surface on the second cylindrical portion of the lens assembly;
   a plurality of protruding tabs arranged asymmetrically on the external cylindrical surface;
   an image sensor; and
   a lens moving mechanism that includes a movable sleeve having internal threads that receive the externally threaded portion of the lens assembly, the lens moving mechanism being coupled to the image sensor such that the second cylindrical portion of the lens assembly is closest to the image sensor, the lens moving mechanism having an opening to receive the lens assembly that requires alignment of the plurality of protruding tabs to corresponding recesses in the opening of the lens moving mechanism such that the lens assembly is received in the opening of the lens moving mechanism in only one angular position.

9. The camera module of claim 8 wherein the lens assembly includes at least two lenses, one lens being mounted in the second cylindrical portion of the lens assembly.

10. The camera module of claim 8 wherein the lens moving mechanism is a voice coil motor.

11. The camera module of claim 8 wherein the plurality of protruding tabs are each chamfered to have a width of a top surface of the protruding tab that is narrower than a width of a bottom surface of the protruding tab such that force is required to insert the plurality of protruding tabs past the corresponding recesses in the opening of the lens moving mechanism.

12. The camera module of claim 8 wherein the corresponding recesses in the opening of the lens moving mechanism are each chamfered to have a width of a top opening that is narrower than a width of a bottom opening such that force is required to insert the protruding tab past the corresponding recesses in the opening of the lens moving mechanism.

13. The camera module of claim 8 further comprising a retaining structure that is attached to the lens moving mechanism after the lens assembly is received in the lens moving mechanism to reduce a diameter of the opening to be less than a diameter of the lens assembly.

14. The camera module of claim 8 further comprising a substrate to which the image sensor is attached and a protective structure attached to the substrate at a location where the protective structure prevents the lens assembly from contacting the image sensor when not engaged with the lens moving mechanism.

15. A camera module comprising:
a lens assembly that includes a lens barrel having a first cylindrical portion that includes an externally threaded portion and a second cylindrical portion that has a larger diameter than the externally threaded portion;
an image sensor;
a lens moving mechanism that includes a movable sleeve having internal threads that receive the externally threaded portion of the lens assembly, the lens moving mechanism being coupled to the image sensor such that the second cylindrical portion of the lens assembly is closest to the image sensor, the lens moving mechanism having an opening to receive the lens assembly; and
a retaining structure that is attached to the lens moving mechanism after the lens assembly is received in the lens moving mechanism to reduce a diameter of the opening to be less than a diameter of the lens assembly.

16. The camera module of claim 15 wherein the lens assembly includes at least two lenses, one lens being mounted in the second cylindrical portion of the lens assembly.

17. The camera module of claim 15 wherein the lens moving mechanism is a voice coil motor.

18. The camera module of claim 15 wherein an external cylindrical surface of the second cylindrical portion of the lens assembly includes at least one protruding tab and the opening to receive the lens assembly requires alignment of the protruding tab to a corresponding recess in the opening of the lens moving mechanism.

19. The camera module of claim 18 wherein the protruding tab is chamfered to have a width of a top surface of the protruding tab that is narrower than a width of a bottom surface of the protruding tab such that force is required to insert the protruding tab past the corresponding recess in the opening of the lens moving mechanism.

20. The camera module of claim 18 wherein the corresponding recess in the opening of the lens moving mechanism is chamfered to have a width of a top opening that is narrower than a width of a bottom opening such that force is required to insert the protruding tab past the corresponding recess in the opening of the lens moving mechanism.

21. The camera module of claim 15 further including a plurality of protruding tabs that are arranged asymmetrically on an external cylindrical surface of the second cylindrical portion of the lens assembly and a plurality of corresponding recesses in the opening of the lens moving mechanism that require alignment of the plurality of protruding tabs to the plurality of corresponding recesses such that the lens assembly is received in the opening of the lens moving mechanism in only one angular position.

22. The camera module of claim 15 further comprising a substrate to which the image sensor is attached and a protective structure attached to the substrate at a location where the protective structure prevents the lens assembly from contacting the image sensor when not engaged with the lens moving mechanism.

23. A camera module comprising:
a lens assembly that includes a lens barrel having a first cylindrical portion that includes an externally threaded portion and a second cylindrical portion that has a larger diameter than the externally threaded portion;
an image sensor;
a lens moving mechanism that includes a movable sleeve having internal threads that receive the externally threaded portion of the lens assembly, the lens moving mechanism being coupled to the image sensor such that the second cylindrical portion of the lens assembly is closest to the image sensor;
a substrate to which the image sensor is attached; and
a protective structure attached to the substrate at a location where the protective structure prevents the lens assembly from contacting the image sensor when not engaged with the lens moving mechanism.

24. The camera module of claim 23 wherein the lens assembly includes at least two lenses, one lens being mounted in the second cylindrical portion of the lens assembly.

25. The camera module of claim 23 wherein the lens moving mechanism is a voice coil motor.

26. The camera module of claim 23 wherein an external cylindrical surface of the second cylindrical portion of the lens assembly includes at least one protruding tab and the lens moving mechanism has an opening to receive the lens assembly that requires alignment of the protruding tab to a corresponding recess in the opening of the lens moving mechanism.

27. The camera module of claim 26 wherein the protruding tab is chamfered to have a width of a top surface of the protruding tab that is narrower than a width of a bottom surface of the protruding tab such that force is required to insert the protruding tab past the corresponding recess in the opening of the lens moving mechanism.

28. The camera module of claim 26 wherein the corresponding recess in the opening of the lens moving mechanism is chamfered to have a width of a top opening that is narrower than a width of a bottom opening such that force is required to insert the protruding tab past the corresponding recess in the opening of the lens moving mechanism.

29. The camera module of claim 23 further including a plurality of protruding tabs that are arranged asymmetrically on an external cylindrical surface of the second cylindrical portion of the lens assembly and the lens moving mechanism has an opening to receive the lens assembly that requires alignment of the plurality of protruding tabs to corresponding recesses in the opening of the lens moving mechanism such that the lens assembly is received in the opening of the lens moving mechanism in only one angular position.

30. The camera module of claim 23 wherein the lens moving mechanism has an opening to receive the lens assembly and further comprising a retaining structure that is attached to the lens moving mechanism after the lens assembly is received in the lens moving mechanism to reduce a diameter of the opening to be less than a diameter of the lens assembly.

* * * * *